United States Patent
Tateno et al.

(10) Patent No.: US 9,111,177 B2
(45) Date of Patent: Aug. 18, 2015

(54) POSITION/ORIENTATION MEASUREMENT APPARATUS, PROCESSING METHOD THEREFOR, AND NON-TRANSITORY COMPUTER-READABLE STORAGE MEDIUM

(75) Inventors: Keisuke Tateno, Kawasaki (JP); Masakazu Fujiki, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 13/702,365

(22) PCT Filed: Jun. 9, 2011

(86) PCT No.: PCT/JP2011/063752
§ 371 (c)(1),
(2), (4) Date: Dec. 6, 2012

(87) PCT Pub. No.: WO2011/158885
PCT Pub. Date: Dec. 22, 2011

(65) Prior Publication Data
US 2013/0076865 A1 Mar. 28, 2013

(30) Foreign Application Priority Data
Jun. 18, 2010 (JP) ................................. 2010-139948

(51) Int. Cl.
*H04N 13/00* (2006.01)
*H04N 13/04* (2006.01)
(Continued)

(52) U.S. Cl.
CPC .............. *G06K 9/6217* (2013.01); *G01B 11/03* (2013.01); *G01B 11/25* (2013.01); *G06K 9/78* (2013.01); *G06T 7/0046* (2013.01); *G06T 2207/30164* (2013.01)

(58) Field of Classification Search
USPC .............................. 386/326, 335; 348/42, 51
See application file for complete search history.

(56) References Cited

U.S. PATENT DOCUMENTS

| 5,612,905 A | 3/1997 | Maillart et al. |
| 6,438,272 B1 | 8/2002 | Huang et al. |

(Continued)

FOREIGN PATENT DOCUMENTS

| EP | 1574818 A2 | 9/2005 |
| JP | 2002-071313 A | 3/2002 |
| JP | 2008-275391 A | 11/2008 |

OTHER PUBLICATIONS
JP 2010-039201, Nakazato et al, Feb. 24, 2010, Japan Patent Office.*
(Continued)

*Primary Examiner* — Daquan Zhao
(74) *Attorney, Agent, or Firm* — Fitzpatrick, Cella, Harper & Scinto

(57) ABSTRACT

A position/orientation measurement apparatus holds a three-dimensional shape model of a object, acquires approximate value indicating a position and an orientation of the object, acquires a two-dimensional image of the object, projects a geometric feature of the three-dimensional shape model on the two-dimensional image based on the approximate value, calculates the direction of the geometric feature of the three-dimensional shape model projected on the two-dimensional image, detects an image feature based on the two-dimensional image, calculates the direction of the image feature, associates the image feature and the geometric feature by comparing the direction of the image feature calculated based on the two-dimensional image and the direction of the geometric feature calculated based on the three-dimensional shape model, and calculates the position and orientation of the object by correcting the approximate value based on the distance between the geometric feature and the image feature associated therewith.

8 Claims, 7 Drawing Sheets

(51) Int. Cl.
  *G06K 9/62*   (2006.01)
  *G01B 11/03*  (2006.01)
  *G01B 11/25*  (2006.01)
  *G06K 9/78*   (2006.01)
  *G06T 7/00*   (2006.01)
  *H04N 5/92*   (2006.01)
  *H04N 5/84*   (2006.01)
  *H04N 5/89*   (2006.01)

(56) References Cited

U.S. PATENT DOCUMENTS

| | | | |
|---|---|---|---|
| 6,993,450 | B2 | 1/2006 | Takemoto et al. |
| 7,092,109 | B2 | 8/2006 | Satoh et al. |
| 7,130,754 | B2 | 10/2006 | Satoh et al. |
| 7,414,732 | B2 | 8/2008 | Maidhof et al. |
| 7,420,556 | B2 | 9/2008 | Fujiki |
| 7,664,341 | B2 | 2/2010 | Takemoto et al. |
| 7,860,345 | B2 | 12/2010 | Satoh et al. |
| 8,223,146 | B2 | 7/2012 | Kotake et al. |
| 8,326,021 | B2 | 12/2012 | Kobayashi et al. |
| 8,639,025 | B2 | 1/2014 | Kobayashi et al. |
| 2008/0267454 | A1 | 10/2008 | Kobayashi et al. |
| 2010/0142826 | A1 | 6/2010 | Kotake et al. |
| 2010/0289797 | A1 | 11/2010 | Tateno et al. |
| 2010/0295924 | A1 | 11/2010 | Miyatani et al. |
| 2011/0211066 | A1 | 9/2011 | Fujiki |
| 2012/0262455 | A1 | 10/2012 | Watanabe et al. |
| 2012/0268567 | A1* | 10/2012 | Nakazato et al. ............... 348/46 |
| 2012/0275654 | A1 | 11/2012 | Fujiki et al. |
| 2013/0077854 | A1 | 3/2013 | Kobayashi et al. |

OTHER PUBLICATIONS

T Drummond et al., "Real-Time Visual Tracking of Complex Structures", IEEE Transactions on Pattern Analysis and Machine Intelligence, vol. 24, No. 7, pp. 932-946, (2002).

H. Wuest et al., "Adaptive line tracking with multiple hypotheses for augmented reality", Proc. The Fourth Int'l. Symposium on Mixed and Augmented Reality (ISMAR05), pp. 62-69, (2005).

R.Y. Tsai, "A versatile camera calibration technique for high-accuracy 3D machine vision metrology using off-the-shelf TV cameras and lenses", IEEE Journal of Robotics and Automation, vol. RA-3, No. 4, (1987).

L. Vacchetti, et al., "Combining edge and texture information for real-time accurate 3D camera tracking", Proc. 3rd IEEE/ACM International Symposium on Mixed and Augmented Reality (ISMAR"04), pp. 48-57, (2004).

* cited by examiner

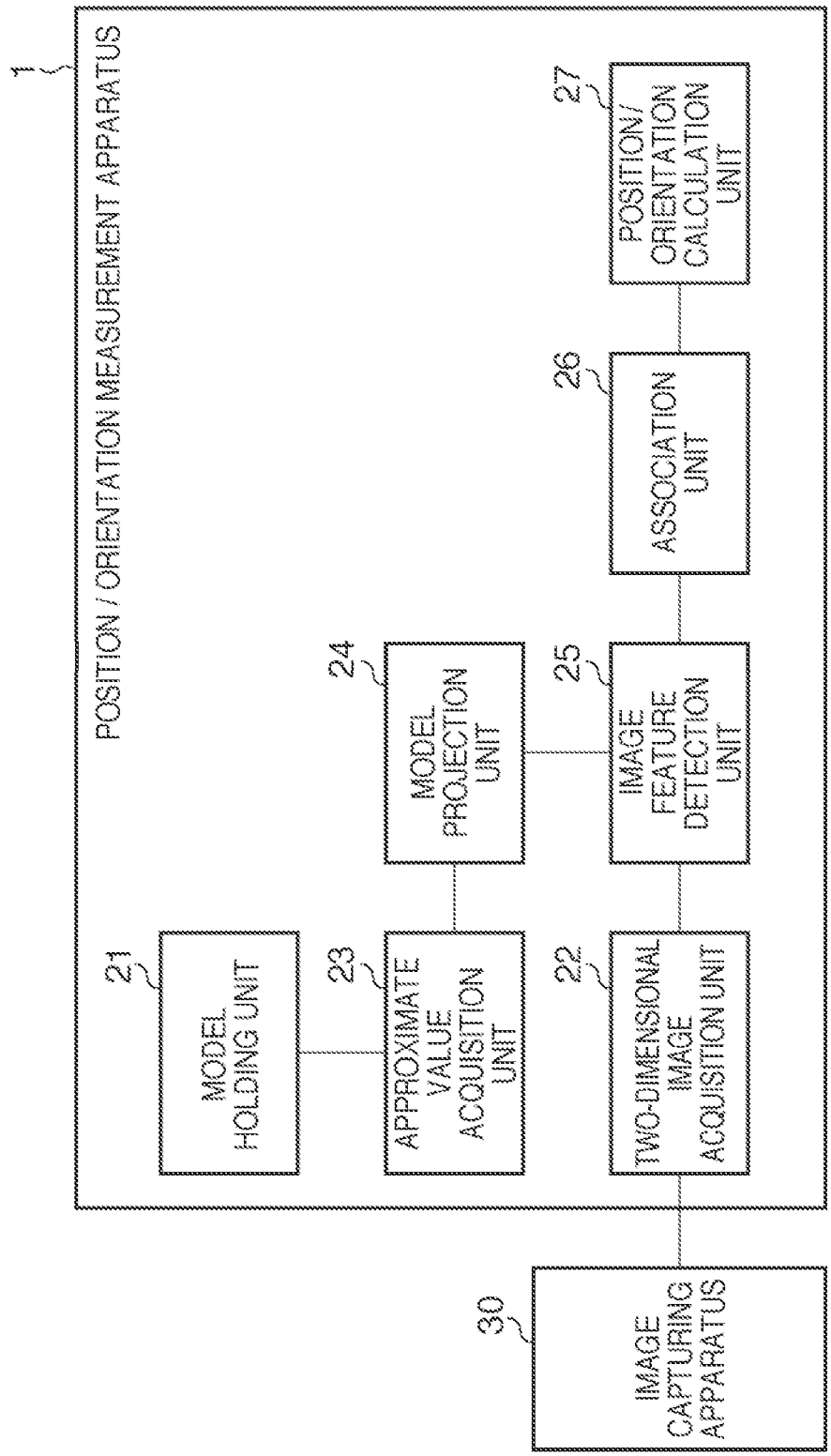

FIG. 2C

| POINT | X | Y | Z |
|---|---|---|---|
| P1 | 200 | 200 | 0 |
| P2 | 200 | 200 | 150 |
| P3 | 100 | 200 | 150 |
| P4 | 100 | 200 | 350 |
| P5 | 200 | 200 | 350 |
| P6 | 200 | 200 | 500 |
| P7 | 0 | 200 | 500 |
| P8 | 0 | 200 | 0 |
| P9 | 0 | 100 | 0 |
| P10 | 0 | 100 | 500 |
| P11 | 0 | 0 | 500 |
| P12 | 0 | 0 | 0 |
| P13 | 200 | 0 | 0 |
| P14 | 200 | 0 | 500 |

FIG. 2D

| LINE | 2 END POINTS | EDGE TYPE |
|---|---|---|
| L1 | P1-P6 | SHAPE CHANGE PORTION |
| L2 | P2-P3 | FLAT PORTION |
| L3 | P3-P4 | FLAT PORTION |
| L4 | P4-P5 | FLAT PORTION |
| L5 | P6-P7 | SHAPE CHANGE PORTION |
| L6 | P7-P11 | SHAPE CHANGE PORTION |
| L7 | P11-P12 | SHAPE CHANGE PORTION |
| L8 | P12-P13 | SHAPE CHANGE PORTION |
| L9 | P1-P13 | SHAPE CHANGE PORTION |
| L10 | P8-P12 | SHAPE CHANGE PORTION |
| L11 | P9-P10 | SHAPE CHANGE PORTION |
| L12 | P7-P8 | SHAPE CHANGE PORTION |
| L13 | P1-P8 | SHAPE CHANGE PORTION |
| L14 | P13-P14 | SHAPE CHANGE PORTION |
| L15 | P6-P14 | SHAPE CHANGE PORTION |
| L16 | P11-P14 | SHAPE CHANGE PORTION |

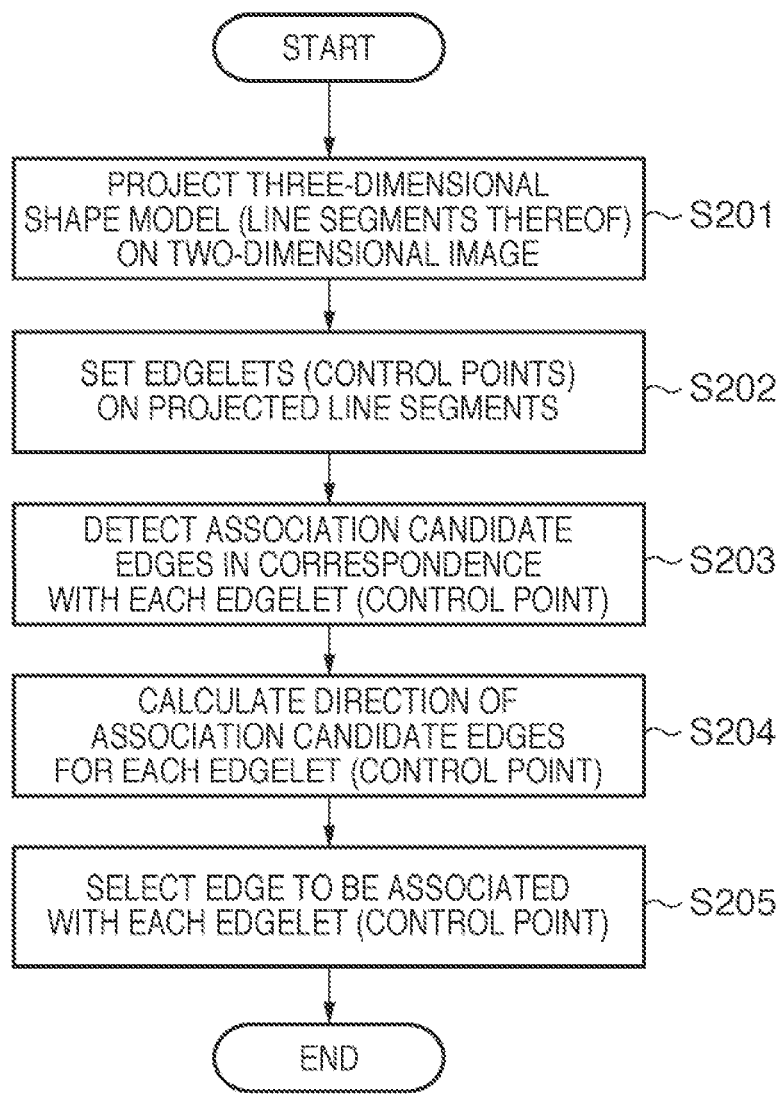

POSITION/ORIENTATION MEASUREMENT APPARATUS, PROCESSING METHOD THEREFOR, AND NON-TRANSITORY COMPUTER-READABLE STORAGE MEDIUM

TECHNICAL FIELD

The present invention relates to a position/orientation measurement apparatus, a processing method therefor, and a non-transitory computer-readable storage medium.

BACKGROUND ART

In recent years, complex tasks that have conventionally been performed by people have come to be performed more and more by robots instead. One typical example of a complex task is the assembly of industrial products. Such a robot grasps parts with an end effector, such as a hand, and assembles them. In order for a robot to grasp a part, it is necessary to measure the relative positions and orientations of the part to be grasped and the robot (hand).

In general, as an example of a method to perform such position and orientation measurement, there is known to be technology for model-fitting (applying) a three-dimensional shape model of an object to image features detected based on a two-dimensional image captured by a camera and a depth map obtained from a range sensor.

Technology that employs edges as image features to be detected based on a two-dimensional image is disclosed in "Real-time visual tracking of complex structures" by T. Drummond and R. Cipolla, IEEE Transactions on Pattern Analysis and Machine Intelligence, vol. 24, no. 7, pp. 932-946, 2002 (hereinafter, referred to as "Document 1"). With this technology, the shape of an object is represented by a set of three-dimensional line segments, and given that information indicating the approximate position and orientation of the object is known, a projection image of the three-dimensional line segments is model-fitted to edges detected in the two-dimensional image. Performing measurement that employs edges is suited for cases of measuring the position and orientation of an object in, for example, an environment that contains many texture-less straight-line-based artificial objects.

Here, in order to accurately measure the position and orientation of an object based on image features detected based on a two-dimensional image, it is necessary to accurately associate the detected image features and geometric features in the three-dimensional shape model.

In the aforementioned Document 1, three-dimensional line segments are associated with edges detected in the vicinity of positions at which the three-dimensional line segments were projected on a two-dimensional image. In other words, with this method, the edge detected in the closest vicinity of a three-dimensional line segment projection image is considered to be the correctly associated edge. For this reason, if the edge detected in the closest vicinity is an edge that should not originally be associated, it is impossible to accurately measure the position and orientation of the object, and the precision in measurement decreases. In particular, in the case where the approximate position and orientation of an object are inaccurate, or the case where a two-dimensional image is complex, and a large number of edges are detected as association candidates, erroneous associations will arise in the association of edges and line segments in a three-dimensional shape model.

In order to solve such a problem, a technique of improving precision in the association of line segments in a three-dimensional shape model and edges in a grayscale image by employing luminance values in the periphery of the edges is disclosed in "Adaptive line tracking with multiple hypotheses for augmented reality" by H. Wuest, F. Vial, and D. Stricker, Proc. The Fourth Int'l Symp. on Mixed and Augmented Reality (ISMAR05), pp. 62-69, 2005 (hereinafter, referred to as "Document 2"). Specifically, learning images are used to teach in advance what kind of luminance distribution segments in a three-dimensional shape model are to be detected as in an image line. Degrees of similarity with luminance distributions in the periphery of edges actually detected in the grayscale image are then calculated, and edges are associated based on the results of the calculation. This technology is useful in, for example, the case where a luminance distribution that can be uniquely identified is included as surface information of the target object.

As described above, a technique of associating edges using luminance in a grayscale image is effective in the case where the apparent luminance distribution has high reproducibility, such as the case where the target object has uniquely identifiable surface color information.

However, luminance in a grayscale image varies diversely depending on the surface information of the object, the state of the light source, and the viewpoint from which the object is observed, and therefore depending on the surface color of the target object and the environmental situation, there is a high possibility of erroneous association occurring between image features and geometric features in a three-dimensional shape model.

SUMMARY OF INVENTION

The present invention provides technology for, using the directions of image features in a two-dimensional image, associating the image features and geometric features constituting a three-dimensional shape model, and measuring the position and orientation of an object based on the results of the association.

According to a first aspect of the present invention, there is provided a position/orientation measurement apparatus comprising: a model holding means for holding a three-dimensional shape model representing a geometric feature of an object; an approximate value acquisition means for acquiring an approximate value indicating a position and an orientation of the object; an image acquisition means for acquiring a two-dimensional image of the object captured by an image capturing apparatus; a projection means for projecting the geometric feature of the three-dimensional shape model on the two-dimensional image based on the approximate value, and calculating the direction of the geometric feature of the three-dimensional shape model projected on the two-dimensional image; a detection means for detecting an image feature based on the two-dimensional image and calculating the direction of the image feature; an association means for associating the image feature and the geometric feature by comparing the direction of the image feature calculated based on the two-dimensional image and the direction of the geometric feature calculated based on the three-dimensional shape model; and a position/orientation calculation means for calculating the position and the orientation of the object by correcting the approximate value based on the distance between the geometric feature and the image feature associated therewith by the association means.

According to a second aspect of the present invention, there is provided a processing method for a position/orientation measurement apparatus, comprising: a step of acquiring an approximate value indicating a position and an orientation of an object; a step of acquiring a two-dimensional image of the object captured by an image capturing apparatus; a step of projecting a geometric feature of a three-dimensional shape model representing the geometric feature of the object on the two-dimensional image based on the approximate value, and calculating the direction of the geometric feature of the three-dimensional shape model projected on the two-dimensional image; a step of detecting an image feature based on the two-dimensional image and calculating the direction of the image feature; a step of associating the image feature and the geometric feature by comparing the direction of the image feature calculated based on the two-dimensional image and the direction of the geometric feature calculated based on the three-dimensional shape model; and a step of calculating the position and the orientation of the object by correcting the approximate value based on the distance between the geometric feature and the image feature associated therewith.

According to a third aspect of the present invention, there is provided a non-transitory computer-readable storage medium storing a computer program for causing a computer to function as a model holding means for holding a three-dimensional shape model representing a geometric feature of an object; an approximate value acquisition means for acquiring an approximate value indicating a position and an orientation of the object; an image acquisition means for acquiring a two-dimensional image of the object captured by an image capturing apparatus; a projection means for projecting the geometric feature of the three-dimensional shape model on the two-dimensional image based on the approximate value, and calculating the direction of the geometric feature of the three-dimensional shape model projected on the two-dimensional image; a detection means for detecting an image feature based on the two-dimensional image and calculating the direction of the image feature; an association means for associating the image feature and the geometric feature by comparing the direction of the image feature calculated based on the two-dimensional image and the direction of the geometric feature calculated based on the three-dimensional shape model; and a position/orientation calculation means for calculating the position and the orientation of the object by correcting the approximate value based on the distance between the geometric feature and the image feature associated therewith by the association means.

Further features of the present invention will be apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention, and together with the description, serve to explain the principles of the invention.

FIG. 1 is a diagram showing an example of the configuration of a position/orientation measurement apparatus 1 according to an embodiment of the present invention.

FIGS. 2A to 2D are diagrams showing an example of the definition of a three-dimensional shape model.

FIG. 4 is a flowchart showing an example of the flow of processing performed when detecting an edge based on a two-dimensional image.

DESCRIPTION OF EMBODIMENTS

Figure 2A:
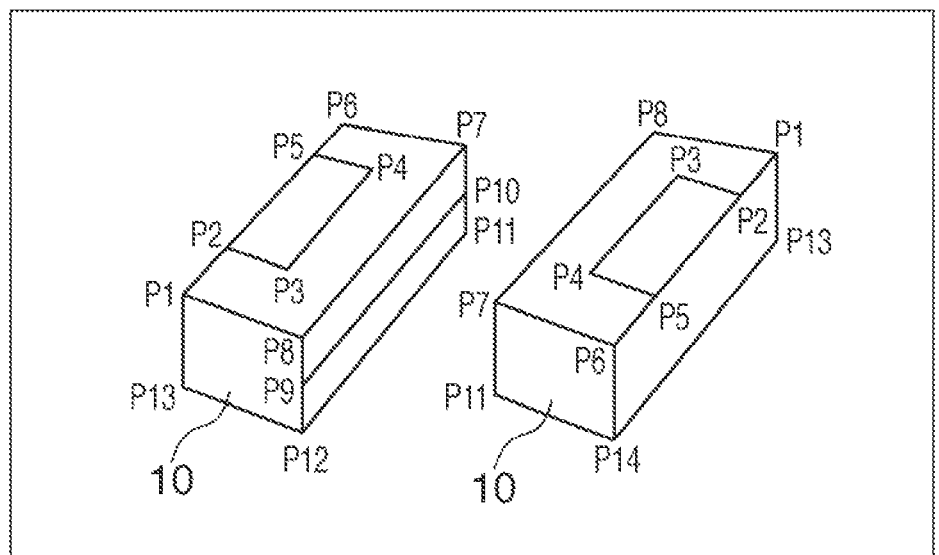

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

FIG. 1 is a diagram showing an example of the configuration of a position/orientation measurement apparatus 1 according to an embodiment of the present invention. Note that in the present embodiment, it is assumed that the approximate position and orientation of an object targeted for measurement (hereinafter, also referred to as a "measurement target object" or simply an "object") is known. The position and orientation of the object are then measured (estimated) by associating three-dimensional shape model data (hereinafter, simply referred to as a "three-dimensional shape model") and a two-dimensional image (grayscale image) based on the approximate values.

Here, if the object targeted for measurement is considered to be a substantially rigid body, there will be no change in the reciprocal relationship between locations on the surface of the object even if the target object is rotated or displaced as a whole. If the approximate position and orientation of the object are close to the actual position and orientation of the object to a certain degree, the reciprocal relationship between directions in a two-dimensional projection image of three-dimensional line segments on the surface of the object, namely boundaries between faces, also tends to generally be maintained.

In view of this, in the present embodiment, focusing on this characteristic, differences between a direction in a projection image obtained by projecting a three-dimensional line segment in a three-dimensional shape model and the directions of edges in a two-dimensional image are calculated, and the edge for which the difference is closest to the overall mode value is determined to be the corresponding edge. Thus, the position and orientation of an object are measured.

In the present embodiment, the position/orientation measurement apparatus 1 is connected to an image capturing apparatus 30. Note that the image capturing apparatus 30 may be built into the position/orientation measurement apparatus 1.

The image capturing apparatus 30 is a camera, for example, and captures two-dimensional images. Although the case where the two-dimensional image captured by the image capturing apparatus 30 is a grayscale image expressing luminance values of the object targeted for measurement is taken as an example in the description of the present embodiment, there is no limitation to this, and a color image, for example, may be captured.

The two-dimensional image captured by the image capturing apparatus 30 is input to the position/orientation measurement apparatus 1 via a two-dimensional image acquisition unit 22. Note that internal parameters (parameters used in two-dimensional image capturing) such as the camera focal length, principal point position, and lens distortion parameters have been calibrated in advance using, for example, the method disclosed in "A versatile camera calibration technique for high-accuracy 3D machine vision metrology using off-the-shelf TV cameras and lenses" by R. Y. Tsai, IEEE Journal of Robotics and Automation, vol. RA-3, no. 4, 1987.

Based on a three-dimensional shape model representing the shape of the object targeted for measurement, which is held in a model holding unit 21, the position/orientation measurement apparatus 1 measures the position and orientation of the object in the two-dimensional image. Note that in the present embodiment, it is assumed that the three-dimensional shape model held in the position/orientation measurement apparatus 1 (in the model holding unit 21) conforms to the shape of the object that is actually imaged.

Regarding its functional configuration, the position/orientation measurement apparatus 1 is configured by the model holding unit 21, the two-dimensional image acquisition unit 22, an approximate value acquisition unit 23, a model projection unit 24, an image feature detection unit 25, an association unit 26, and a position/orientation calculation unit 27.

The model holding unit 21 holds the three-dimensional shape model of the object targeted for measurement. In the three-dimensional shape model, geometric features of the object (the shape of the object) are defined using a plurality of line segments (edges), for example.

More specifically, the three-dimensional shape model is defined by a set of points and a set of line segments obtained by connecting the points. As shown in FIG. 2A, a three-dimensional shape model 10 of an object is configured by 14 points, namely points P1 to P14. As shown in FIG. 2C, the points P1 to P14 are represented by three-dimensional coordinate values. Note that P12 is assumed to be the origin of the reference coordinate system prescribed in the three-dimensional shape model 10. Also, the x axis is the direction from the point P12 to the point P13, the y axis is the direction from the point P12 to the point P8, and the z axis is the direction from the point P12 to the point P11. Note that the y axis coincides with the vertical rising direction (direction opposite the gravity axis).

Figure 2B:
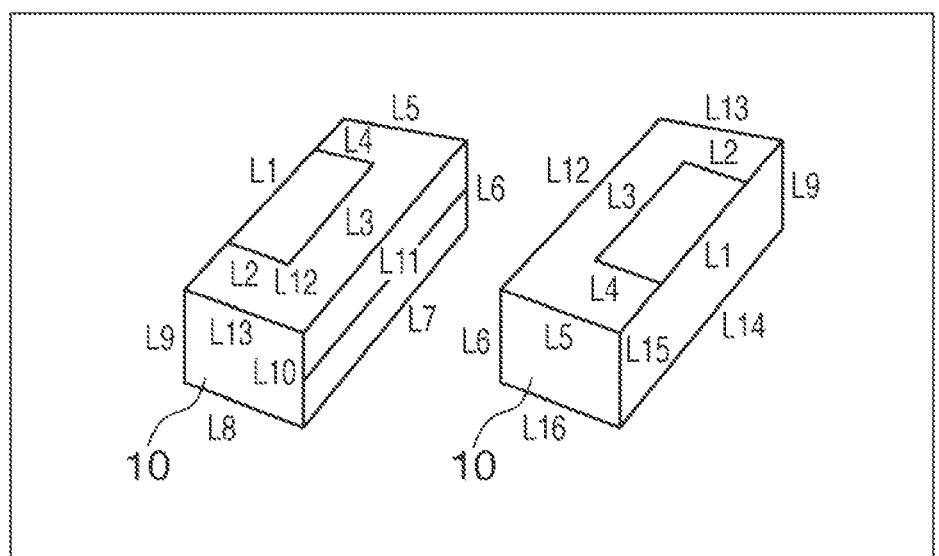

As shown in FIG. 2B, the three-dimensional shape model 10 is furthermore configured by line segments L1 to L16. The line segments L1 to L16 are, as shown in FIG. 2D, each represented by an ID (identifier) indicating the points configuring the line segment. Note that although not shown in the figures, the three-dimensional shape model 10 also holds surface information. In this case, each surface is represented by an ID indicating the vertices configuring the surface.

The approximate value acquisition unit 23 acquires approximate values of the position and orientation of the object relative to the position/orientation measurement apparatus 1. Although the position and orientation of the object relative to the position/orientation measurement apparatus 1 are described as being the position and orientation of the object using the image capturing apparatus 30 (camera coordinate system) as a reference in the present embodiment, it is not absolutely necessary to use the image capturing apparatus 30 as the reference. For example, if the relative position and orientation of the object relative to the coordinate system of the image capturing apparatus 30 are known, and furthermore the position and orientation do not change, another portion in the position/orientation measurement apparatus 1 may be used as the reference. Also, in the present embodiment, measurement values obtained by the position/orientation measurement apparatus 1 measuring the object in the past (e.g., in the immediately previous measurement) are used as the approximate values of the position and orientation of the object. Note that it is not absolutely necessary for the approximate values of the position and orientation of the object to be such values. For example, a configuration is possible in which time-series filtering processing (e.g., a linear filter or a Kalman filter) may be carried out on measurement values of the position and orientation of the object obtained in a past measurement, and the movement velocity and angular velocity of the object are estimated. Values obtained by predicting the position and orientation of the object based on the results of the estimation may then be used as the approximate values. Also, the position and orientation of the object obtained from an external sensor may be used as the approximate values. In such a case, the sensor needs to at least be able to measure the position and orientation of the object with six degrees of freedom, and there are no particular limitations on the type of sensor (e.g., magnetic, optical, or ultrasonic). Note that as long as values indicating the general position at which and orientation in which the object is placed are known in advance, such values may be used as the approximate values.

Using the internal parameters of the image capturing apparatus 30 and the approximate values acquired by the approximate value acquisition unit 23, the model projection unit 24 projects the three-dimensional shape model held by the model holding unit 21 on the two-dimensional image (on the grayscale image). Then, as a result of the projection, the two-dimensional coordinates and the two-dimensional directions of the line segments configuring the three-dimensional shape model are calculated. Note that the method of projecting the three-dimensional shape model is described later.

The image feature detection unit 25 detects, as image features, edges based on the two-dimensional image acquired by the two-dimensional image acquisition unit 22. The image feature detection unit 25 then calculates normal lines of directions in a luminance distribution, as the directions of the edges. The method of detecting the edges is described later.

The association unit 26 associates the image features (edges) detected by the image feature detection unit 25 and the geometric features of the three-dimensional shape model (the line segments configuring the three-dimensional shape model). In this association processing, the line segments in the three-dimensional shape model calculated by the model projection unit 24 are associated with edges in the two-dimensional image based on the differences between the two-dimensional directions of the line segments in the three-dimensional shape model and the directions of the edges in the two-dimensional image. Note that details of the association processing are described later.

The position/orientation calculation unit 27 calculates the position and orientation of the object using the association relationships (sets) of the line segments in the three-dimensional shape model and the edges in the two-dimensional image associated with each other by the association unit 26. Note that details of the processing for calculating the position and orientation of the object are described later.

This completes the description of an example of the configuration of the position/orientation measurement apparatus 1. Note that a computer is built into the position/orientation measurement apparatus 1 described above. The computer is equipped with a main control unit such as a CPU, and a storage unit such as a ROM (Read Only Memory), a RAM (Random Access Memory), or an HDD (Hard Disk Drive). The computer may additionally be equipped with, for example, input/output units such as buttons and a display or a touch panel, and a communication unit such as a network card. Note that such constituent members are connected by a bus or the like, and are controlled by the main control unit executing a program stored in the storage unit.

Figure 3:
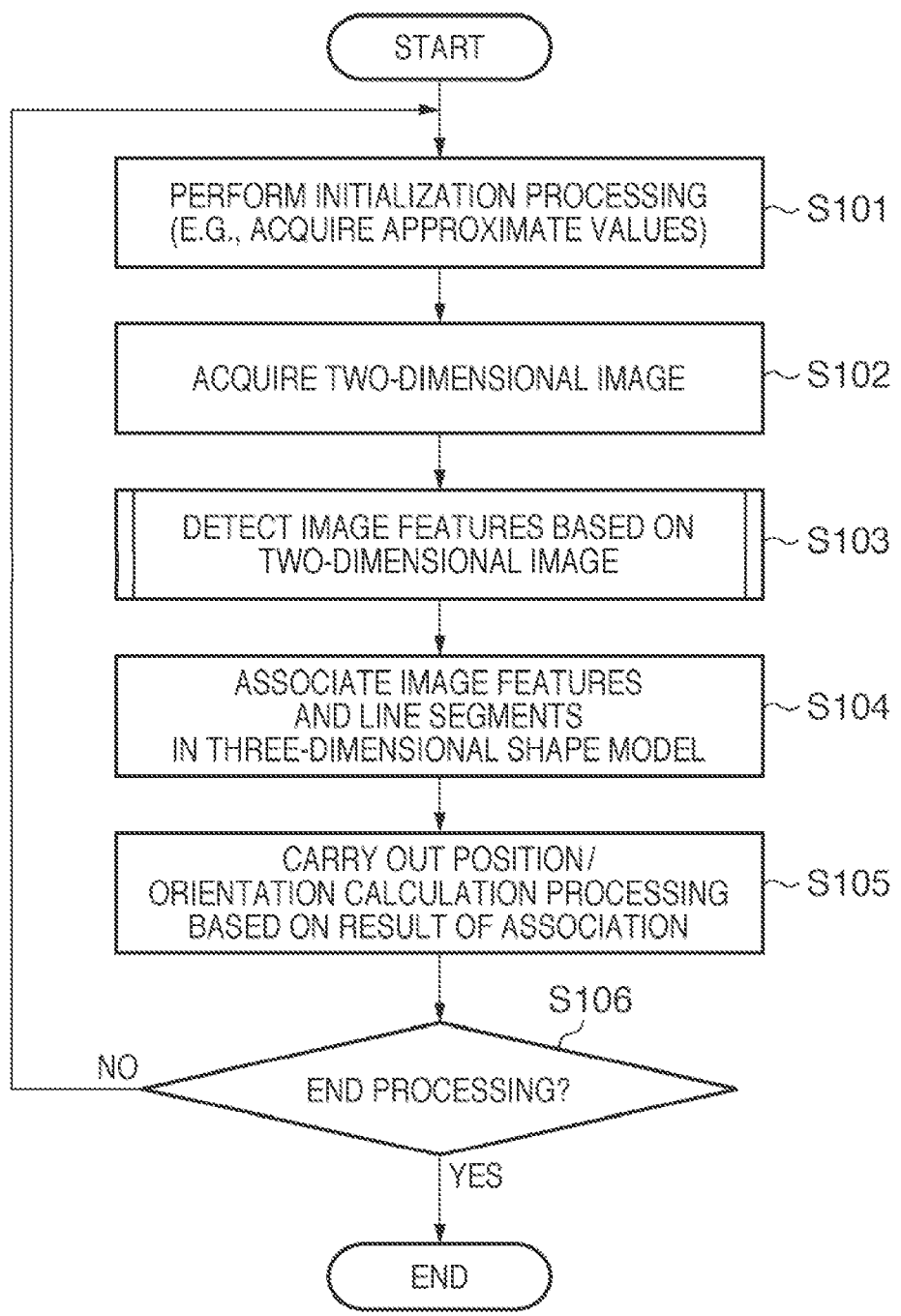
FIG. 3 is a flowchart showing an example of the flow of overall processing performed when measuring the position and orientation of an object.

Next is a description of an example of the flow of processing performed by the position/orientation measurement apparatus 1 shown in FIG. 1 when measuring the position and orientation of a measurement target object, with reference to FIG. 3.

S101

Firstly, the position/orientation measurement apparatus 1 performs initialization processing. In this initialization processing, the approximate value acquisition unit 23 acquires approximate values of the position and orientation of an object relative to the position/orientation measurement apparatus 1, for example. In the present embodiment, measurement values obtained by the position/orientation measurement apparatus 1 measuring the object in the past (e.g., in the immediately previous measurement) are used as the approximate values of the position and orientation of the object, as described above. Also, the internal parameters of the image capturing apparatus 30 and the like are also acquired in the initialization processing.

S102

The two-dimensional image acquisition unit 22 of the position/orientation measurement apparatus 1 acquires a two-dimensional image (grayscale image) of the object via the image capturing apparatus 30.

S103

The image feature detection unit 25 of the position/orientation measurement apparatus 1 detects edges as image features of the object based on the two-dimensional image acquired in the processing of S102. The edges are points that are extremums in a density gradient. In the present embodiment, edge detection is performed using the method disclosed in "Combining edge and texture information for real-time accurate 3D camera tracking" by L. Vacchetti, V. Lepetit, and P. Fua, Proc. 3rd IEEE/ACM International Symposium on Mixed and Augmented Reality (ISMAR '04), pp. 48-57, 2004.

The following describes the edge detection performed in S103. FIG. 4 shows an example of the flow of processing performed when detecting edges based on a two-dimensional image (grayscale image).

S201

Firstly, the model projection unit 24 of the position/orientation measurement apparatus 1 projects the three-dimensional shape model on a two-dimensional image using the approximate values acquired in the processing of S101 and the internal parameters of the image capturing apparatus 30. Note that the three-dimensional shape model is projected by calculation. For this reason, this projection results in the calculation of a direction and coordinates in the two-dimensional image for each line segment (each geometric feature) configuring the three-dimensional shape model. The projection image of the three-dimensional shape model (line segments) is expressed by line segments in the two-dimensional image as well.

S202

Next, the model projection unit 24 of the position/orientation measurement apparatus 1 sets control points in the projection image (projected line segments) calculated in the processing of S201. The control points are set so as to divide the projected line segments in equal intervals. Hereinafter, these control points are referred to as "edgelets".

For each edgelet (for each control point), the position/orientation measurement apparatus 1 holds the three-dimensional coordinates and three-dimensional direction of the line segment configuring the three-dimensional shape model, and the two-dimensional coordinates and two-dimensional direction obtained as a result of projection. Note that the number of edgelets is appropriately changed in conformity with the shape of the object, for example. Also, since the processing time becomes longer as the number of edgelets increases, the interval between edgelets may be appropriately changed so as to keep a constant total number of edgelets.

S203

When the setting of the edgelets (control points) ends, the image feature detection unit 25 of the position/orientation measurement apparatus 1 detects a corresponding edge in the two-dimensional image for each edgelet (for each control point) set in the processing of S202. The following describes an outline of the edge detection of the present embodiment with reference to FIGS. 5A and 5B.

Figure 5A:
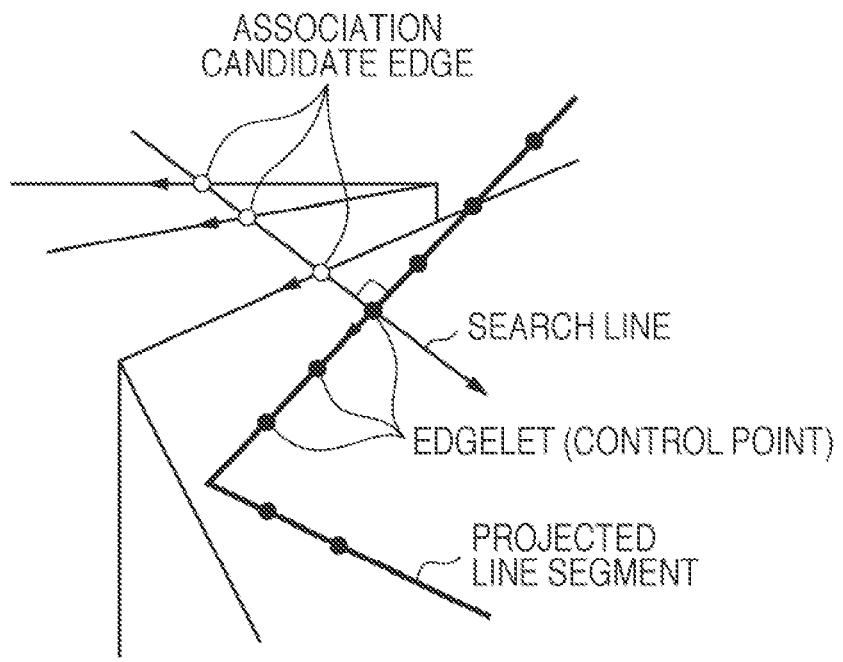
FIGS. 5A and 5B are diagrams showing an outline of edge detection.
Figure 5B:
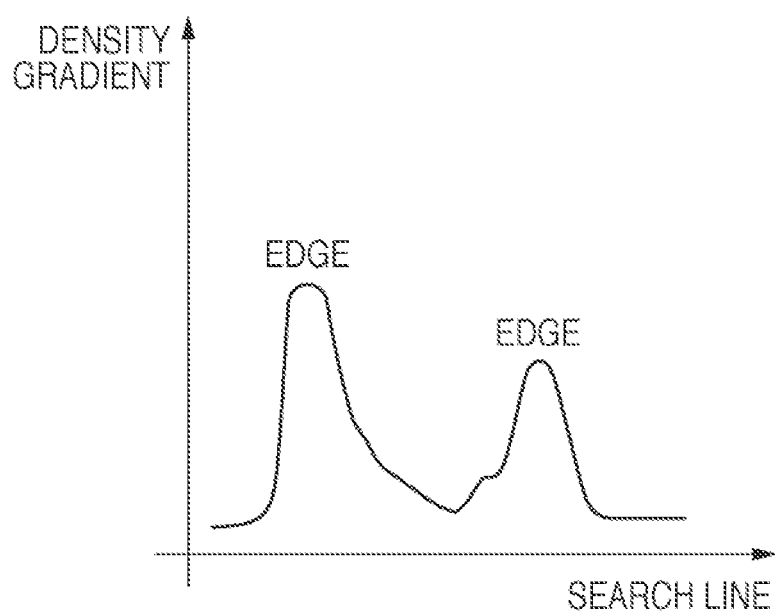

As shown in FIG. 5A, edge detection is carried out by performing a one-dimensional search for an edge on a line segment (hereinafter, referred to as a "search line") that is parallel to the normal direction of the projection image (projected line segment) and furthermore passes through an edgelet. Here, as shown in FIG. 5B, the image feature detection unit 25 calculates extremums based on the density gradient of the two-dimensional image on the search line (in this case, a plurality of extremums (edges) exist). In other words, edges exist at positions on the search line where an extremum lies in the density gradient. Then, for each edgelet, the two-dimensional coordinates of all the edges detected on the search line are held as positions of edges that are candidates for the edge to be associated with the edgelet (association candidate edges). Such processing results in the detection of edges serving as association candidates in the two-dimensional image, for each geometric feature (more specifically, for each edgelet) in the three-dimensional shape model.

When the detection of association candidate edges ends, the image feature detection unit 25 of the position/orientation measurement apparatus 1 calculates the direction of each association candidate edge detected in the processing of S203. It is sufficient that the direction of an edge is obtained by performing filtering processing on pixels in the vicinity of an association candidate edge using an edge detection filter, and obtaining the direction of the edge based on the gradient direction of the pixels obtained by such filtering processing. In the present embodiment, a horizontal Sobel filter and a vertical Sobel filter are applied to pixels in a predetermined range (e.g., nine pixels) from the association candidate edge, and the results thereof are normalized. Accordingly, a gradient direction of the pixels is calculated. The normal direction of the gradient direction is then obtained and acquired as the direction of the edge.

Note that it is not absolutely necessary to employ a technique using Sobel filters in the calculation of the gradient direction of pixels. In other words, there are no limitations on such a technique as long as it is possible to calculate the gradient direction of the edge of interest. For example, a different edge detection filter such as a Prewitt filter may be used. A configuration is also possible in which a gradient direction is calculated by detecting an edge based on the overall image using a Canny algorithm.

S204

The above processing is carried out on all of the edgelets, thus calculating the positions and directions of all of the association candidate edges at all of the edgelets.

S104

Returning now to the description of FIG. 3, for each of the edgelets on the line segments configuring the three-dimensional shape model, the association unit 26 of the position/orientation measurement apparatus 1 associates any one of the association candidate edges.

Figure 6A:
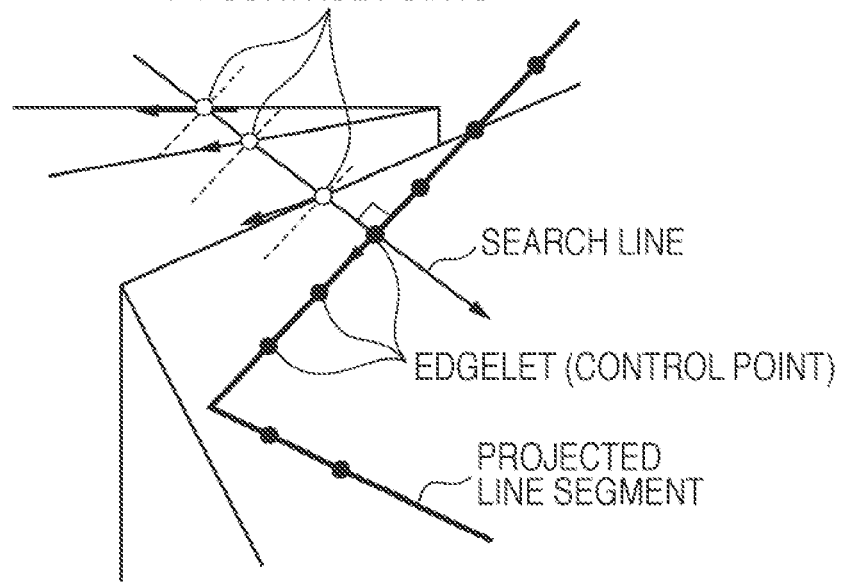
FIGS. 6A and 6B are diagrams showing an outline of association processing.
Figure 6B:
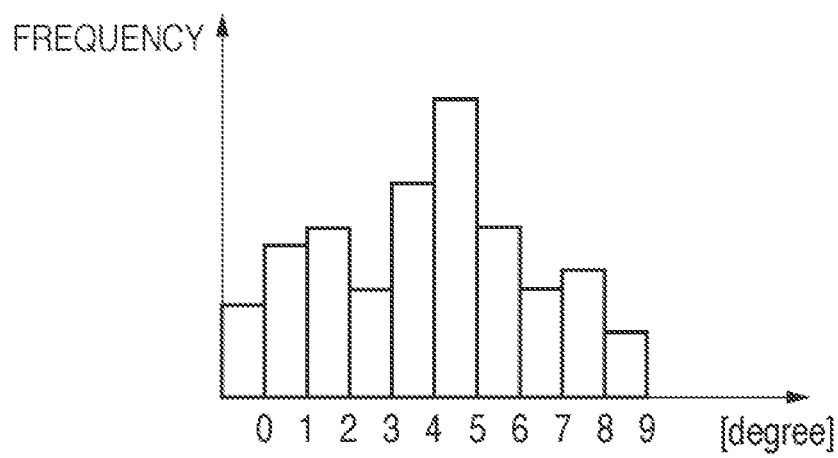

The following describes the association processing performed by the association unit 26 with reference to FIGS. 6A and 6B.

Firstly, at all of the edgelets, the association unit 26 calculates the difference between the direction of the line segment of the three-dimensional shape model and the direction of each of the association candidate edges (FIG. 6A). A histogram is then created based on the differences in direction (FIG. 6B).

The peak in the histogram indicates the mode value of the differences between the direction of the line segment of the three-dimensional shape model and the directions of each of the association candidate edges at each of all of the edgelets. At this time, the magnitude of the horizontal axis (bin) of the histogram serves as an adjustment parameter. The smaller the unit of bin is, the higher the performance in the resolution of edge directions is. On the other hand, since edge directions fluctuate due to the influence of noise that depends on the unit of bin, the smaller the unit of bin is, the more readily edge directions are influenced by noise. In view of this, in the present embodiment, the unit of bin in the histogram is set to 1 [degree].

Next, for each of the edgelets, the association unit 26 compares the direction of the line segment configuring the three-dimensional shape model and the direction of each of the association candidate edges, and checks whether each difference therebetween is within a predetermined range from the mode value. The association candidate edge for which the difference between the two directions is within the predetermined range from the mode value is kept as an association edge, and the other association candidate edges are considered to be erroneously associated association candidate edges and are excluded. At this time, if a plurality of association candidate edges remain, the association candidate edge that was detected in the closest vicinity of the edgelet is selected from among the remaining association candidate edges as the edge to be associated.

Here, the threshold value used when checking whether differences in direction are within the predetermined range from the mode value serves as the adjustment parameter. It is desirable that this parameter is adjusted according to the degree to which edge direction detection errors occur. In the present embodiment, the edge direction detection error is considered to be 5 [degrees], and the threshold value is set to 5 [degrees]. Such processing is repeated for all of the association candidate edges of all of the edgelets, and an association edge is determined for all of the edgelets. When the determination of an association edge for all of the edgelets ends, the processing of S104 is ended, and the procedure proceeds to the processing of S105.

S105

Next, the position/orientation calculation unit 27 of the position/orientation measurement apparatus 1 calculates (measures) three-dimensional information regarding the object (the position and orientation of the measurement target object relative to the position/orientation measurement apparatus 1). In the present embodiment, the position and orientation of the object are calculated by using nonlinear optimization calculation to correct, through an iterative operation, the approximate values indicating the approximate position and orientation of the object.

More specifically, the approximate values of the position and orientation of the object are corrected by performing an iterative operation using the Gauss-Newton method, which is one example of a nonlinear optimization technique. Thus, the position and orientation of the object are calculated. Note that the position/orientation calculation processing is not limited to the Gauss-Newton method, and for example, the Levenberg-Marquardt method achieving more robust calculation may be used, or a steepest descent method that is a simpler method may be used. Also, another nonlinear optimization calculation technique such as a conjugate gradient method or an ICCG method may be used.

Here, the position and orientation of the object are calculated using the edges (the three-dimensional coordinates thereof) in the two-dimensional image associated by the association unit 26 and the line segments in the three-dimensional shape model (converted to the camera coordinate system based on the approximate values). In other words, the approximate values of the position and orientation of the object are optimized based on differences in distance in a three-dimensional space between the association edges and the line segments.

More specifically, linear approximation is performed on a signed distance between a point and a straight line in the three-dimensional space as a function of the position and orientation of the object. Linear simultaneous equations relating to minute change in the position and orientation of the object that bring the signed distance to zero are established and solved. This obtains minute change in the position and orientation of the object, and processing for correcting this value is repeated. Note that since it is sufficient to use conventional technology (e.g., the technology disclosed in Document 1) to realize the calculation of the position and orientation of the object, a detailed description of such processing will not be given.

S106

Lastly, the position/orientation measurement apparatus 1 determines whether this processing is to be ended. Whether this processing is to be ended is determined based on, for example, whether a user has instructed the end of processing. Here, if the user has instructed the end of processing, this processing is ended as is, and if the user has not instructed the end of processing, a new two-dimensional image is obtained, and the processing described above is performed again.

As described above, according to the present embodiment, edges to be associated with line segments configuring a three-dimensional shape model are determined using information (edge directions) on which change in luminance in a two-dimensional image (grayscale image) has little direct influence. For this reason, the association of line segments in the three-dimensional shape model and edges in the two-dimensional image can be performed with stable precision, regardless of the color information of the object, the state of the light source, and the viewpoint from which the object is observed.

Accordingly, the position and orientation of the object can be measured robustly even in a scene in which, for example, the object is an object for which identification by a luminance distribution is difficult, there is change in the state of the light source, or there is change in the relative positions/orientations of the object and the light source.

Although an example of a representative embodiment of the present invention has been given above, the present invention is not limited to the embodiment described above and shown in the drawings, and appropriate modifications can be made without departing from the gist of the present invention. The following describes exemplary variations.

Variation 1

In the embodiment described above, when selecting an association edge from among association candidate edges, a mode value calculated based on differences between the direction of a line segment in the three-dimensional shape model and the directions of all of the association candidate edges at all of the edgelets is used as a reference value, but there is no limitation to this. For example, instead of a mode value, a median value of the differences between the two-dimensional directions of the edgelets and the association candidate edges may be used. Specifically, a configuration is possible in which, for all of the association candidate edges of all of the edgelets, the difference between the two-dimensional directions of the line segment of the three-dimensional shape model and the association candidate edge is obtained, the median value (average value) of all of the differences in direction is calculated, and the edge for which the difference in direction is within a predetermined range from the median value is selected as (determined to be) the corresponding edge.

Also, there is no limitation to such a reference value (mode value or median value), and it is sufficient for the reference value to be an indicator that enables determining whether the two-dimensional direction of a line segment in the three-dimensional shape model and the direction of an association candidate edge are similar to each other as a whole.

Variation 2

Although the case of the image feature detected based on a two-dimensional image being an edge is described in the above embodiment, the image feature is not limited to being an edge. For example, inflection points on a three-dimensional face and the directions thereof may be stored as the three-dimensional shape model. A method may then be employed in which a region in which the grayscale changes gently is detected as a feature in the two-dimensional image, and the direction in which the density changes is calculated as the direction of the feature. Specifically, a configuration is possible in which the position and orientation of an object are measured (estimated) by associating inflection points on a three-dimensional face and grayscale change portions in a two-dimensional image based on the directions of grayscale change in the two-dimensional image and the directions of the inflection points on the three-dimensional face. There is no limitation on the expression of the feature as long as it is a feature that can express a position and direction in a two-dimensional image.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-139948 filed on Jun. 18, 2010, which is hereby incorporated by reference herein in its entirety.

The invention claimed is:

1. A position/orientation measurement apparatus comprising:
    a model holding unit configured to hold a three-dimensional shape model representing a geometric feature of an object;
    an approximate value acquisition unit configured to acquire an approximate value indicating a position and an orientation of the object;
    an image acquisition unit configured to acquire a two-dimensional image of the object captured by an image capturing apparatus;
    a projection unit configured to project the geometric feature of the three-dimensional shape model on the two-dimensional image based on the approximate value, and to calculate the direction of the geometric feature of the three-dimensional shape model projected on the two-dimensional image;
    a detection unit configured to detect an image feature based on the two-dimensional image and to calculate the direction of the image feature;
    an association unit configured to associate the image feature and the geometric feature by comparing the direction of the image feature calculated based on the two-dimensional image and the direction of the geometric feature calculated based on the three-dimensional shape model; and
    a position/orientation calculation unit configured to calculate the position and the orientation of the object by correcting the approximate value based on the distance between the geometric feature and the image feature associated therewith by the association unit,
    wherein for each geometric feature in the three-dimensional shape model projected on the two-dimensional image by the projection unit, the detection unit detects a plurality of image features based on the two-dimensional image in correspondence with the geometric feature, and calculates the direction of each of the image features,
    wherein the association unit comprises
        a calculation unit configured to, for each geometric feature of the three-dimensional shape model projected on the two-dimensional image by the projection unit, calculate the difference between the direction of the geometric feature and the direction of each of the corresponding image features, and to calculate a reference value based on the obtained differences in direction of the image features at the geometric features, and
        a selection unit configured to, for each of the geometric features, select any image feature whose difference in direction is within a predetermined range from the reference value, from among the plurality of image features detected in correspondence with the geometric feature, and
    wherein the association unit associates the selected image features with the corresponding geometric features.

2. A position/orientation measurement apparatus comprising
    a model holding unit configured to hold a three-dimensional shape model representing a geometric feature of an object;
    an approximate value acquisition unit configured to acquire an approximate value indicating a position and an orientation of the object;
    an image acquisition unit configured to acquire a two-dimensional image of the object captured by an image capturing apparatus;
    a projection unit configured to project the geometric feature of the three-dimensional shape model on the two-dimensional image based on the approximate value, and calculate the direction of the geometric feature of the three-dimensional shape model projected on the two-dimensional image;

a detection unit configured to detect an image feature based on the two-dimensional image and calculate the direction of the image feature;

an association unit configured to associate the image feature and the geometric feature by comparing the direction of the image feature calculated based on the two-dimensional image and the direction of the geometric feature calculated based on the three-dimensional shape model; and a position/orientation calculation unit configured to calculate the position and the orientation of the object by correcting the approximate value based on the distance between the geometric feature and the image feature associated therewith by the association unit, wherein the geometric feature in the three-dimensional shape model is a line segment indicating the shape of the object, wherein, for each of a plurality of control points set in equal intervals on the line segment in the three-dimensional shape model projected on the two-dimensional image by the projection unit, the detection unit detects a plurality of edges as image features based on the two-dimensional image in correspondence with the control point, and calculates the direction of each of the edges, wherein the association unit comprises
- a calculation unit configured, for each control point, to calculate the difference in direction of each of the corresponding edges relative to the line segment, and to calculate a reference value based on the obtained differences in direction of the edges at the control points, and
- a selection unit configured to, for each of the control points, selecting any edge whose difference in direction is within a predetermined range from the reference value, from among the plurality of edges detected in correspondence with the control point, and wherein the association unit associates the selected edges with the corresponding control points on the line segment of the three-dimensional shape model.

3. The position/orientation measurement apparatus according to claim 2, wherein the reference value is a mode value of the differences in direction of all of the edges at all of the control points.

4. The position/orientation measurement apparatus according to claim 2, wherein the reference value is an average value of the differences in direction of all of the edges at all of the control points.

5. A processing method for a position/orientation measurement apparatus, comprising:

a step of acquiring an approximate value indicating a position and an orientation of an object;

a step of acquiring a two-dimensional image of the object captured by an image capturing apparatus;

a step of projecting a geometric feature of a three-dimensional shape model representing the geometric feature of the object on the two-dimensional image based on the approximate value, and calculating the direction of the geometric feature of the three-dimensional shape model projected on the two-dimensional image;

a step of detecting an image feature based on the two-dimensional image and calculating the direction of the image feature;

a step of associating the image feature and the geometric feature by comparing the direction of the image feature calculated based on the two-dimensional image and the direction of the geometric feature calculated based on the three-dimensional shape model; and a step of calculating the position and the orientation of the object by correcting the approximate value based on the distance between the geometric feature and the image feature associated therewith, wherein, for each geometric feature in the three-dimensional shape model projected on the two-dimensional image in the step of projecting, the step of detecting detects a plurality of image features based on the two-dimensional image in correspondence with the geometric feature, and calculates the direction of each of the image features, wherein the step of associating comprises
- a step of, for each geometric feature of the three-dimensional shape model projected on the two-dimensional image in the step of projecting, calculating the difference between the direction of the geometric feature and the direction of each of the corresponding image features and calculating a reference value based on the obtained differences in direction of the image features at the geometric features, and
- a step of selecting, for each of the geometric features, any image feature whose difference in direction is within a predetermined range from the reference value, from among the plurality of image features detected in correspondence with the geometric feature, and wherein the association unit associates the selected image features with the corresponding geometric features.

6. A non-transitory computer-readable storage medium storing a computer program for causing a computer to function as a model holding unit configured to hold a three-dimensional shape model representing a geometric feature of an object;

an approximate value acquisition unit configured to acquire an approximate value indicating a position and an orientation of the object;

an image acquisition unit configured to acquire a two-dimensional image of the object captured by an image capturing apparatus;

a projection unit configured to project the geometric feature of the three-dimensional shape model on the two-dimensional image based on the approximate value, and to calculate the direction of the geometric feature of the three-dimensional shape model projected on the two-dimensional image;

a detection unit configured to detect an image feature based on the two-dimensional image and to calculate the direction of each of the image feature;

an association unit configured to associate the image feature and the geometric feature by comparing the direction of the image feature calculated based on the two-dimensional image and the direction of the geometric feature calculated based on the three-dimensional shape model; and a position/orientation calculation unit configured to calculate the position and the orientation of the object by correcting the approximate value based on the distance between the geometric feature and the image feature associated therewith by the association unit, wherein, for each geometric feature in the three-dimensional shape model projected on the two-dimensional image by the projection unit, the detection unit detects a plurality of image features based on the two-dimensional image in correspondence with the geometric feature, and calculates the direction of each of the image features, wherein the association unit comprises a calculation unit configured to, for each geometric feature of the three-dimensional shape model projected on the two-dimensional image by the projection unit, calculate the difference between the direction of the geometric feature and the direction of each of the corresponding image features, and calculate a reference value based on the obtained differences in direction of the image features at the geometric features, and a selection unit configured to, for each of the geometric features, select any image feature whose difference in direction is within a predetermined range from the reference value, from among the plurality of image features detected in correspondence with the geometric feature, and wherein the association unit associates the selected image features with the corresponding geometric features.

7. A processing method for a position/orientation measurement apparatus, comprising:

a step of acquiring an approximate value indicating a position and an orientation of an object;

a step of acquiring a two-dimensional image of the object captured by an image capturing apparatus;

a step of projecting the geometric feature of the three-dimensional shape model on the two-dimensional image based on the approximate value, and calculate the direction of the geometric feature of the three-dimensional shape model projected on the two-dimensional image;

a step of detecting an image feature based on the two-dimensional image and calculate the direction of the image feature;

a step of associating the image feature and the geometric feature by comparing the direction of the image feature calculated based on the two-dimensional image and the direction of the geometric feature calculated based on the three-dimensional shape model; and a step of calculating the position and the orientation of the object by correcting the approximate value based on the distance between the geometric feature and the image feature associated therewith in the associating step, wherein the geometric feature in the three-dimensional shape model is a line segment indicating the shape of the object, wherein, for each of a plurality of control points set in equal intervals on the line segment in the three-dimensional shape model projected on the two-dimensional image in the projecting step, the detecting step detects a plurality of edges as image features based on the two-dimensional image in correspondence with the control point, and calculates the direction of each of the edges, wherein the step of associating comprises a step of, for each control point, calculating the difference in direction of each of the corresponding edges relative to the line segment, and calculate a reference value based on the obtained differences in direction of the edges at the control points, and a step of, for each of the control points, selecting any edge whose difference in direction is within a predetermined range from the reference value, from among the plurality of edges detected in correspondence with the control point, and wherein the associating step associates the selected edges with the corresponding control points on the line segment of the three-dimensional shape model.

8. A non-transitory computer-readable storage medium storing a computer program for causing a computer to function as a model holding unit configured to hold a three-dimensional shape model representing a geometric feature of an object;

an approximate value acquisition unit configured to acquire an approximate value indicating a position and an orientation of the object;

an image acquisition unit configured to acquire a two-dimensional image of the object captured by an image capturing apparatus;

a projection unit configured to project the geometric feature of the three-dimensional shape model on the two-dimensional image based on the approximate value, and calculate the direction of the geometric feature of the three-dimensional shape model projected on the two-dimensional image;

a detection unit configured to detect an image feature based on the two-dimensional image and calculate the direction of the image feature;

an association unit configured to associate the image feature and the geometric feature by comparing the direction of the image feature calculated based on the two-dimensional image and the direction of the geometric feature calculated based on the three-dimensional shape model; and a position/orientation calculation unit configured to calculate the position and the orientation of the object by correcting the approximate value based on the distance between the geometric feature and the image feature associated therewith by the association unit, wherein the geometric feature in the three-dimensional shape model is a line segment indicating the shape of the object, wherein, for each of a plurality of control points set in equal intervals on the line segment in the three-dimensional shape model projected on the two-dimensional image by the projection unit, the detection unit detects a plurality of edges as image features based on the two-dimensional image in correspondence with the control point, and calculates the direction of each of the edges, wherein the association unit comprises a calculation unit configured to, for each control point, calculate the difference in direction of each of the corresponding edges relative to the line segment, and calculate a reference value based on the obtained differences in direction of the edges at the control points, and a selection unit configured to for each of the control points, selecting any edge whose difference in direction is within a predetermined range from the reference value, from among the plurality of edges detected in correspondence with the control point, and wherein the association unit associates the selected edges with the corresponding control points on the line segment of the three-dimensional shape model.

* * * * *